(12) United States Patent
Fugleberg

(10) Patent No.: US 6,206,951 B1
(45) Date of Patent: Mar. 27, 2001

(54) METHOD FOR LEACHING NICKEL FROM NICKEL MATTE

(75) Inventor: Sigmund Fugleberg, Turku (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 09/268,434

(22) Filed: Mar. 12, 1999

(30) Foreign Application Priority Data

Mar. 16, 1998 (FI) ........................................ 980581

(51) Int. Cl.$^7$ ....................................... C22B 3/08

(52) U.S. Cl. ................. 75/743; 423/141; 423/150.4; 423/150.6; 423/658.3

(58) Field of Search ................... 75/743; 423/141, 423/150.6, 150.4, 658.3

(56) References Cited

U.S. PATENT DOCUMENTS

| | | | |
|---|---|---|---|
| 3,741,752 | * 6/1973 | Evans et al. | ............ 205/583 |
| 4,304,644 | * 12/1981 | Victorovich et al. | ............ 204/108 |
| 5,344,479 | 9/1994 | Kerfoot et al. | ............ 75/743 |

FOREIGN PATENT DOCUMENTS 2108480A   5/1978 (GB) .

* cited by examiner

*Primary Examiner*—Roy V. King
*Assistant Examiner*—Tima McGuthry-Banks
(74) *Attorney, Agent, or Firm*—Morgan & Finnegan LLP

(57) ABSTRACT

The invention relates to a method for leaching sulfidic nickel matte and particularly copper rich nickel matte, as well as for leaching said matte together with a metallic copper and/or copper-nickel matte. The leach of nickel matte is carried out as pressure leach in one or several stages by means of copper sulfate.

25 Claims, 3 Drawing Sheets

METHOD FOR LEACHING NICKEL FROM NICKEL MATTE

The present invention relates to a method for leaching sulfidic nickel matte, and particularly copper rich nickel matte as well as for leaching said matte together with metallic copper matte and/or copper-nickel matte. The leach of nickel matte is carried out as pressure leach by means of copper sulfate in one or several stages.

In the prior art there is known, among others, a method according to the U.S. Pat. No. 5,628,817, where the leach of nickel-copper matte produced in a pyrometallurgic process is first carried out in at least two atmospheric oxidation stages, with acid and copper as leaching agents. The precipitate from the second atmospheric leach is further leached at subsequent pressure leach stages, and consequently free oxygen does not essentially participate in the first pressure leach.

From the Finnish patent 98,073, there is known a method, according to which from the two mattes produced in the pyrometallurgic treatment of nickel concentrate, i.e. from flash smelting furnace matte and electric furnace matte, nickel is recovered in the same leach process. The smelting furnace matte (FSF matte) containing less iron is first leached in one or two atmospheric leach stages by means of oxygen and the anolyte of nickel electrolysis, and the formed precipitate is conducted to pressure leach. The solution obtained from the pressure leach is conducted to the leach of the matte (SF matte) that contains more iron, and the solution obtained from this leach stage in turn is conducted to the atmospheric leach stages of the smelting furnace matte. The precipitate created in the leach of the matte containing more iron is precipitated as jarosite.

A common feature for both of the above described methods is that nickel matte is first leached in one or two generally atmospheric oxidation stages, where the nickel and copper components $Ni_3S_2$ ja $Cu_2S$ contained in the matte are leached by means of an acidic, copper and iron bearing recircle solution, so that along with the leach process, copper is first leached and then reprecipitated. Among the reactions that take place during the leach, the following are the most essential:

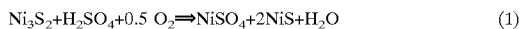
$$Ni_3S_2 + H_2SO_4 + 0.5\ O_2 \Rightarrow NiSO_4 + 2NiS + H_2O \quad (1)$$

$$Ni_3S_2 + CuSO_4 + H_2O + 0.5O_2 \Rightarrow NiSO_4 + 2NiS + Cu(OH)_2 \quad (2)$$

$$Cu_2S + H_2O + 0.5O_2 \Rightarrow CuS + Cu(OH)_2 \quad (3)$$

The most important result from said reactions is that the primary nickel sulfide $Ni_3S_2$ is transformed into secondary nickel sulfide NiS, and the primary copper sulfide, chalcocite $Cu_2S$ is transformed into secondary copper sulfide CuS. It is also important that a remarkable part of the sulfur contained in the matte is oxidized into sulfates, because it is considered that long delay times must be applied at these stages, in order to give this reaction, which is relatively slow at low temperatures, time to proceed. The oxidation of sulfur into sulfate takes place according to the following formula:

$$NiS + 2O_2 \Rightarrow NiSO_4 \quad (4)$$

The precipitate recovered at the atmospheric leach stages is conducted to pressure leach, where nickel is selectively leached by means of a $CuSO_4$ solution, and copper is precipitated as digenite $Cu_9S_5$, which can also be represented in the form $Cu_{1.8}S$:

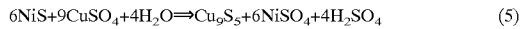
$$6NiS + 9CuSO_4 + 4H_2O \Rightarrow Cu_9S_5 + 6NiSO_4 + 4H_2SO_4 \quad (5)$$

Simultaneously the secondary copper sulfide CuS reacts with the copper sulfate, forming digenite according to the following reaction:

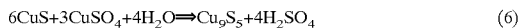
$$6CuS + 3CuSO_4 + 4H_2O \Rightarrow Cu_9S_5 + 4H_2SO_4 \quad (6)$$

From the above reactions (5) and (6) it is observed that in pressure leach, ⅙ of the sulfidic sulfur is oxidized into sulfates, and this sulfate, along with what is formed elsewhere in the process, must be removed from the solution, if the process has closed solution circulation, as is the case if the nickel recovery takes place by means of electrowinning. True enough, the expenses caused by sulfate removal are very high, because in general it is necessary to use expensive neutralizing agents, such as sodium hydroxide NaOH or sodium carbonate $Na_2CO_3$. This drawback of the process has, however, been accepted, because there has not been other available methods for carrying out a selective industrial-scale leach of copper with reasonable costs.

A surprising discovery of the present invention is that from a sulfidic nickel matte created when processing pyrometallurgic nickel-bearing material, and particularly from a copper rich nickel matte, nickel can be selectively leached by means of copper sulfate solution, by applying pressure leach at a high temperature without the above mentioned atmospheric oxidation stages, so that the oxidation of the sulfide contained in the matte into sulfate takes place in a smaller scale than in the prior art methods. After the pressure leach stage, there are the oxidation stages where the iron contained in the matte is precipitated, and the copper sulfide precipitates with a high copper content, formed in the pressure leach, are leached by means of oxygen and acid in order to generate copper sulfate. The pressure leach is carried out in one, two or several stages. If the process deals with essentially metallized matte coming from a further processing furnace located in succession to the smelting furnace, the leach thereof it is carried out as one stage in the leach process, and the copper and nickel bearing solution obtained from this stage is conducted to the last oxidation stage. The essential novel features of the invention are apparent from the appended claims.

Experiments that were carried out proved that in certain conditions, the reaction speeds in the following reactions can be sufficiently high, so that they also fulfill the requirements of industrial processes:

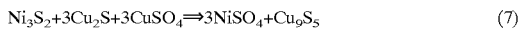
$$Ni_3S_2 + 3Cu_2S + 3CuSO_4 \Rightarrow 3NiSO_4 + Cu_9S_5 \quad (7)$$

$$8Ni_3S_2 + 27CuSO_4 + 4H_2O \Rightarrow 24NiSO_4 + 3\ Cu_9S_5 + 4H_2SO_4 \quad (8)$$

From reaction (7) it is seen that sulfur is not oxidized at all, and in reaction (8) only 1/16 is sulfurized. This means that if the matte contains an amount of copper which is 2× the equivalent amount as compared to nickel, the nickel can be leached selectively without any dissolution of sulfidic sulfur. If there is no copper, only 1/16 of the sulfur is dissolved, i.e. 6.25% as compared to the ⅙, or 16.7%, of the prior art process. In practice this difference is significant, and it can be used for preventing the so-called sulfate swelling that occurs in the processes.

Although the description above refers to sulfidic matte, said matte generally also contains some metal phase, i.e. the amount of sulfur is insufficient in comparison with the given nickel and copper sulfide quantities. It has turned out that also the metal contained in the matte participates in the reactions as follows (Me=Ni, Co, Fe, Cu):

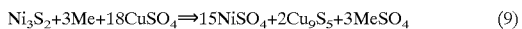
$$Ni_3S_2 + 3Me + 18CuSO_4 \Rightarrow 15NiSO_4 + 2Cu_9S_5 + 3MeSO_4 \quad (9)$$

This again means that if 3/18 (16.7 mole-%) of the metals contained in the matte are present as a metal phase, copper-free matte can be leached without oxidizing the sulfur. Among the important reactions of the present invention, let us also point out the reactions given below, where the digenite produced earlier is used as a neutralizing agent, said reactions taking place at the oxidation stage of the process:

$$CuSO_4 + Cu_9S_5 + O_2 + H_2O \Rightarrow Cu_3(OH)_4SO_4 + CU_7S_5 \qquad (10)$$

$$FeSO_4 + Cu_9S_5 + O_2 + H_2O \Rightarrow Cu_3(OH)_4SO_4 + Fe(OH)_3 + Cu_6S_5 \qquad (11)$$

$$Cu_9S_5 + xH_2SO_4 + x/2\ O_2 \Rightarrow Cu_{9-x}S_5 + xCuSO_4 + xH_2O \qquad (12)$$

In an autoclave, these reactions are very rapid already at temperatures below 100° C., and their proceeding is mainly dependent on the feeding of oxygen. Thus the degree of the reaction can be adjusted by adjusting the amount of oxygen. These reactions do not oxidize sulfur into sulfates. By means of the acid, the basic sulfate, antlerite, formed in reactions (10) and (11) is leached in the following manner, and copper sulfate is created:

$$Cu_3(OH)_4SO_4 + 2H_2SO_4 \Rightarrow 3CuSO_4 + 4\ H_2O \qquad (13)$$

Obviously air or oxygen-enriched air can be used at the oxidation stages instead of oxygen.

BRIEF DESCRIPTION OF THE DRAWINGS

The above described way of utilizing chemistry in the process according to the invention is explained in more detail in the following process descriptions. In connection, there are given the following flow diagrams.

Figure 1A:
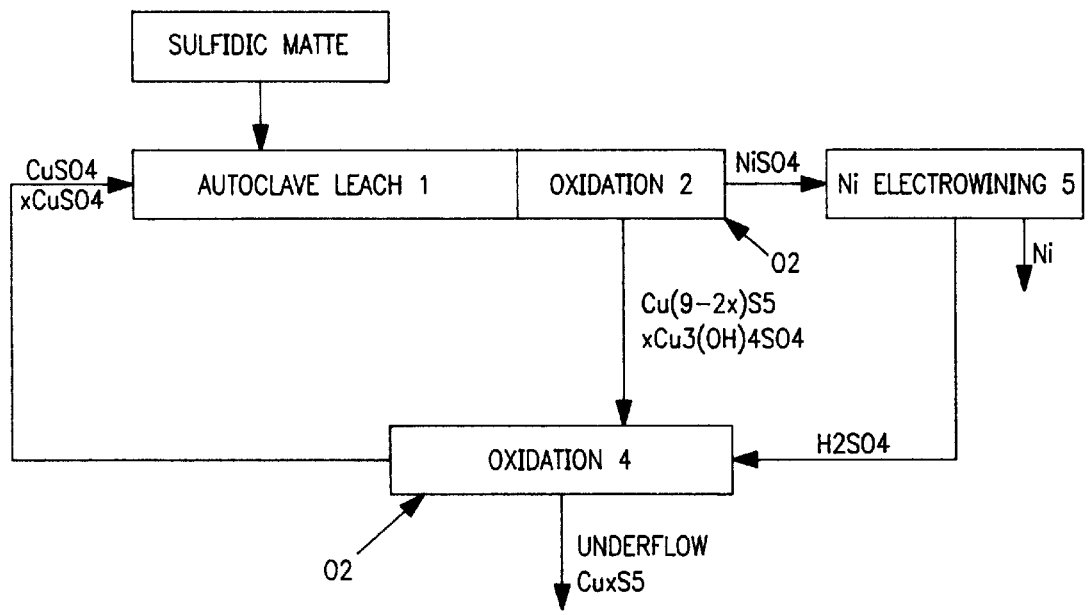
FIG. 1A is a flow diagram illustrating a leach of sulfidic nickel-copper matte coming from a smelting furnace.

The flow diagram 1 illustrates the process in its simplest form. Finely ground sulfidic matte from a smelting furnace, for instance from a FSF, is fed into pressure leach 1 to an autoclave together with a copper sulfate solution, and the primary nickel sulfide $Ni_3S_2$ is leached according to reaction (7) and/or (8). In order to ensure a complete dissolution of nickel, an industrial process must contain a slight excess of copper sulfate, wherefore there is still some $CuSO_4$ left in the solution when all of the nickel is dissolved. In connection with the nickel leach, slight amounts of iron also are dissolved as ferrosulfate $FeSO_4$, because in practice matte always contains small amounts of iron, too. The copper $Cu^{++}$ and iron $Fe^{++}$ of the solution are precipitated according to reactions (10) and (11), by oxidizing them either at the end of the autoclave stage, or at separate atmospheric stage 2. The solution and the solids are separated, and the solution goes via solution cleaning stages (not illustrated) to Ni electrowinning 5. Because the pressure leach stage in practice includes several autoclaves, it can be chosen whether all of the copper sulfate solution is fed into the first autoclave, or whether it is titrated gradually into separate autoclaves according to what is needed.

In nickel electrolysis 5, metallic nickel is precipitated from the nickel sulfate solution, and simultaneously there is produced an equivalent amount of sulfuric acid. The precipitate coming from oxidation stage 2 is composed of digenite precipitate and of the basic copper sulfate, antlerite (but it can also be brochantite, $Cu_4(OH)_6SO_4$), precipitated according to reactions (10) and (11). The acid coming from the electrolysis and the precipitate from the first oxidation stage are conducted to second oxidation stage 4, where the acid is neutralized according to reaction (12) and the basic sulfate according to reaction (13). This oxidation can be performed either in atmospheric conditions or in an autoclave. At all oxidation stages, there can be used either oxygen, oxygen-enriched air or air.

Figure 1B:
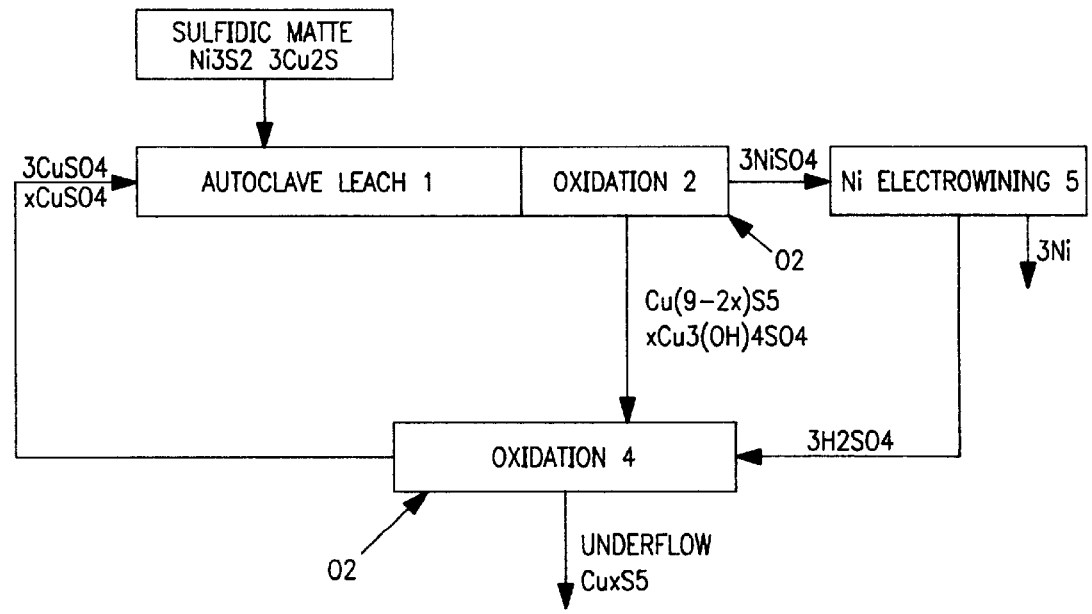
FIG. 1B is otherwise similar to FIG. 1A, but there is added the mass balance of a matte in moles.

FIG. 1B illustrates a similar flow diagram as in FIG. 1A., but the mass balance of a matte in moles is added, when the CuI Ni ratio of sulfidic matte is 2. As was already pointed out, an excess of copper sulfate is conducted into pressure leach, and this is marked as $xCuSO_4$ in the process. Because the amount of supplied copper is not equivalent in relation to the amount of the matte to be leached, the quantity of copper is represented by the factor x also in the created precipitate.

As was maintained above, the FI patent 98,073 describes a method for leaching two mattes, one of which is sulfidic matte coming from a primary smelting furnace, such as a flash smelting furnace, and the second is a matte coming from a further processing furnace, such as an electric furnace, said matte being essentially metallic. The pyrometallurgic production of such mattes is described for example in the U.S. Pat. No. 5,332,414. According to the present invention, both of said mattes can also be leached in one and the same leach process.

Figure 2A:
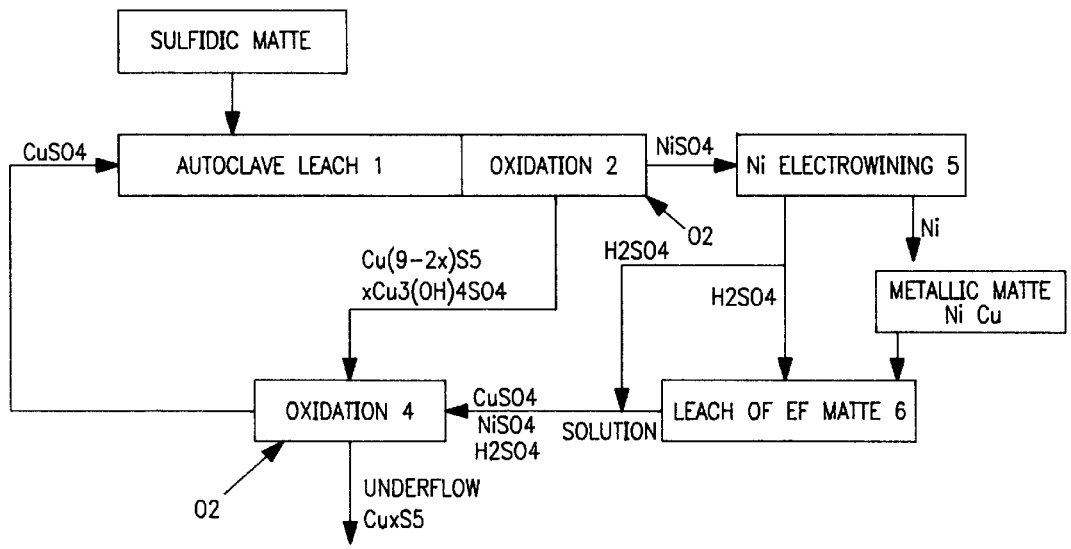
FIG. 2A is a flow diagram illustrating a leach process wherein there are conducted both sulfidic matte from a smelting furnace and matte from a further treatment furnace, which matte is essentially metallic.

FIG. 2A illustrates a flow diagram of a process where both sulfidic nickel-copper matte and mainly metallized matte are leached. According to FIG. 2, finely ground sulfidic nickel-copper matte is first leached in a copper sulfate solution at pressure leach stage 1, and the slurry obtained therefrom is oxidized at oxidation stage 2 in order to oxidize the iron and to remove it from the solution. The nickel sulfate solution obtained from this stage is conducted, via known solution cleaning stages (not illustrated), to nickel electrolysis 5, and the precipitate is conducted to oxidation stage 4. Thus the leach of sulfidic smelting matte takes place exactly in the same fashion as was described above, in reference to flow diagram 1A.

The leach of metallized matte takes place, according to flow diagram 2A, at leach stage 6 by means of the sulfuric acid solution obtained as the return acid from nickel electrolysis 5. In the leach of metallic matte, the whole nickel and copper content of the matte is leached, and the produced solution containing copper sulfate, nickel sulfate and sulfuric acid, is conducted to oxidation stage 4 subsequent to the pressure leach. The amount of created precipitate is small, and it can be treated in known ways. Into oxidation stage 4, there also is conducted, directly from electrolysis 5, that part of the return acid which was not needed at stage 6. It is not necessary to recirculate the solution coming from the leach stage of the metallic matte through oxidation stage 4, unless the solution is acidic.

Figure 2B:
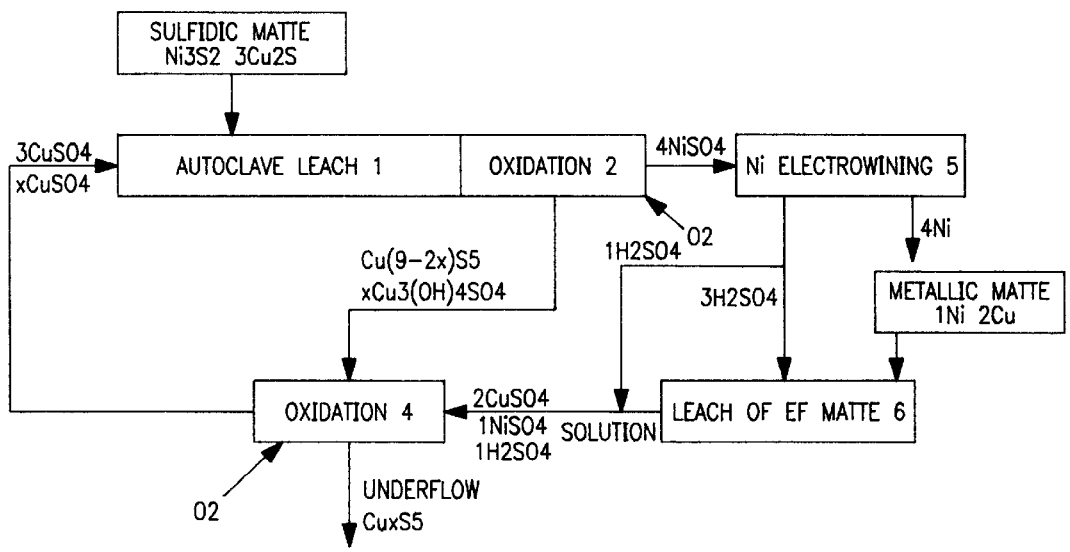
FIG. 2B is otherwise similar to FIG. 2A, but there is added the mass balance of the matte in moles, and FIGS. 3A and 3B respectively illustrate the leach process of nickel matte, which process is carried out as a two-stage pressure leach.

From the mass balance of FIG. 2B, which also is calculated for the Cu/Ni ratio 2/1, a skilled person can see how a process functions, to which there is connected the leach of both the sulfidic nickel-copper matte from the smelting furnace and the essentially metallized copper-nickel matte (SF matte) from the further processing furnace. As was already pointed out, the first part of the process works in the same way as was described in connection with flow diagrams 1A and 1 B. The leach of the SF matte is carried out by conducting sulfuric acid into the leach. From the mass balance of the flow diagram, it can also be calculated that the leach of the two mattes formed in the pyrometallurgic process can also be carried out with a lower Cu/Ni ratio than 2 without the sulfur getting oxidized as yet.

As was already maintained, the nickel leach rate is very high at the beginning, but the leach of the last remnants requires a longer time. Therefore it may sometimes be advantageous to perform the pressure leach in two or more stages. In flow diagram 3A, there is described the leach of sulfidic nickel matte as a two-stage pressure leach. Finely ground sulfidic matte from a smelting furnace is fed into autoclave 1 together with a $CuSO_4$ solution, so that there is an insufficient amount of the $CuSO_4$ solution in relation to the quantity of nickel and copper to be oxidized, in which case reaction (7) proceeds until all copper is precipitated as digenite. Apart from nickel, also some iron is dissolved, because matte always contains some iron.

The slurry produced in the first pressure leach is conducted to oxidation stage 2, where the slurry is carefully oxidized by air or oxygen, so that the bivalent iron $Fe^{++}$ is oxidized and precipitated. Because the quantity of iron is very small, there are practically no changes in the solids. The oxidation can be carried out either in atmospheric conditions or as the last stage of pressure leach. Thereafter the solids are separated from the solution, and the nickel sulfate solution is conducted, via customary cobalt removal (not illustrated), to nickel electrolysis (NiEW) 5, where nickel is precipitated and at the same time there is formed an equivalent amount of sulfuric acid. In between stages 2 and 3, the solids are settled, and the underflow is conducted to the next stage. Now a smaller flow is obtained at the next stages.

The solids obtained from oxidation stage 2 still contain small quantities of nickel, and therefore the precipitate is conducted to pressure leach stage 3, whereto there is fed an excess of the copper sulfate solution in relation to the quantity of nickel, so that the rest of the nickel is fully dissolved. The slurry coming from second pressure leach 3, which slurry is composed of digenite precipitate and of a solution with a low nickel content, is conducted to oxidizing leach 4, whereto there also is fed sulfuric acid formed in nickel electrolysis 5. The purpose of the oxidizing leach is to leach from the digenite precipitate the quantity of copper sulfate that is needed in the pressure leachs.

Second oxidation stage 4 of the process can be either carried out in atmospheric conditions, or it can be the last stage of the preceding pressure each, like earlier oxidizing leach 2. The precipitate coming from the second oxidizing leach is conducted to the copper manufacturing process, and the solution is conducted to preceding pressure leach stages 1 and 3, as was already described above. According to the flow diagram, the leach of metallic matte is connected to the process, and it works exactly in the same way as was illustrated in FIGS. 2A and 2B. Obviously a two-stage pressure leach can also be realized without the leach of metallic matte.

Figure 3A:
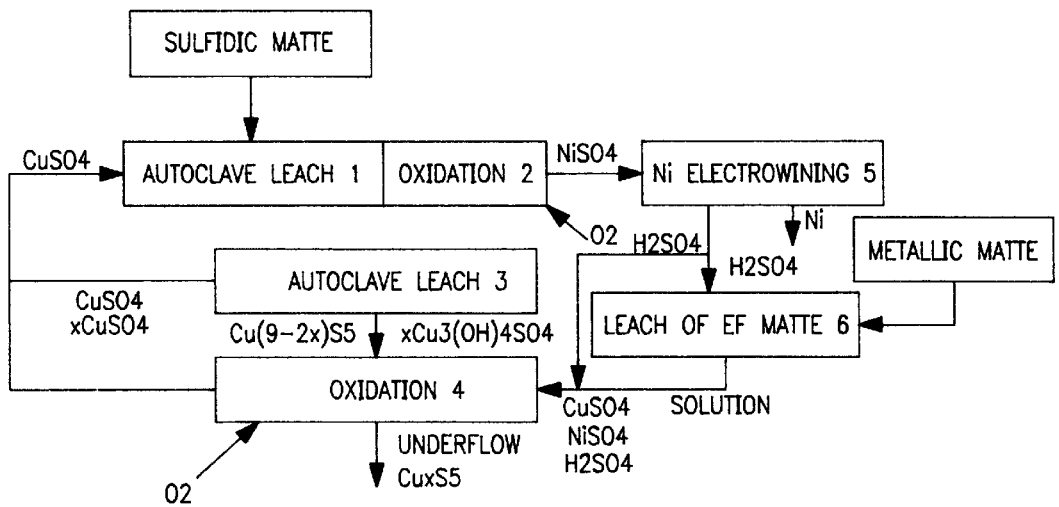
Figure 3B:
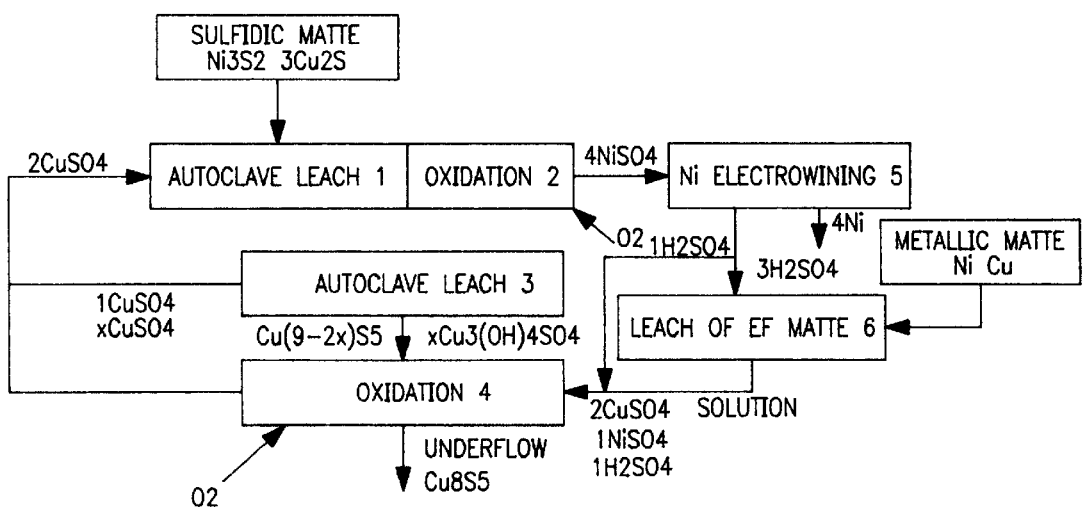

FIG. 3B is basically the same flow diagram as FIG. 3A, with the addition of the mass balance of a matte in moles. Accordingly, when the Cu/Ni ratio is 2/1, into first pressure leach 1 there is fed an insufficient amount of the copper sulfate solution. In this example, the molar ratio of the $CuSO_4$ solution in relation to the quantity of nickel contained in the nickel matte to be fed in is 2/3, but naturally this ratio can be adjusted in order to optimize the process. In the slurry produced in the leach, 1/3 of the primary nickel sulfide $Ni_3S_2$ remains undissolved, and because this does not react at oxidation stage 2, the same quantity of nickel sulfide is conducted to second pressure leach stage 3, too. Into said pressure leach there is fed an excess of copper sulfate solution, so that in the $CuSO_4$ solution, there is a slight excess of copper moles in relation to the undissolved nickel (the excess is marked with x). At last oxidation stage 4, from the digenite precipitated in the pressure leachs copper sulfate is oxidized by feeding to the oxidation stage an equivalent quantity of sulfuric acid per the copper sulfate to be formed.

In the specification above, the method according to the invention is described in a situation where per each nickel mole, the matte contains two copper moles, which is an ideal situation. It is, however, obvious that the invention can also be utilized in situations where the quantity of copper is smaller, because, as was already pointed out, the reaction of primary nickel sulfide ($Ni_3S_2$) with only copper sulfate oxidizes less sulfur than in the prior art methods described above, and since the sulfidic matte also contains some metal phase, this further reduces the formation of sulfate. It is also clear that the process can deal with mattes created in other ways than those referred to in the above description.

The invention is further described with reference to the appended examples.

EXAMPLE 1

This example describes autoclave leach stage 1 of flow diagrams 1, 2 and 3.

An amount of 250 g ground, slowly cooled Ni matte and 2.5 l solution containing 30 g $Cu^{++}$/l as $CuSO_4$ was heated up to 140° C. and kept in an autoclave provided with agitation for 5 hours. The proceeding of the reaction was observed by means of samples that were extracted at intervals given in the table. The results are presented in table 1:

TABLE 1

Example 1 Results

| | Solution g/l | | | | | Pricipitate % | | | | Recovery % | | Composition of end |
|---|---|---|---|---|---|---|---|---|---|---|---|---|
| Time | $Ni^{++}$ | $Cu^{++}$ | $Fe^{++}$ | pH | $H_2SO_4$ | Ni | Cu | Fe | S | Ni | Fe | precipitate |
| 0 | 0 | 43 | | | 0 | 42 | 30 | | 23 | | | |
| 0.5 | 8 | 32 | | | 3 | | | | | | | |
| 1 | 8.5 | 27 | | | 3 | | | | | | | |
| 3 | 13 | 22 | | | 2 | | | | | | | |
| 5 | 18 | 20 | | | 3 | 17 | 57 | | | 59 | | $Cu_2S, Ni_3S_2, Cu_9S_5$ |

From the results it is seen that the quantity of created acid is very small, which proves that the dissolution of nickel has mainly taken place according to reactions (7) and (9) and less according to reaction (8). The reaction speed has been fairly slow.

EXAMPLE 2

The example describes autoclave stage 1 according to the flow diagrams 1, 2 and 3. An amount of 250 g ground matte granulated into water and of a solution containing 62.5 g $Cu^{++}$/l as $CuSO_4$ was heated up to 140° C. and kept in an autoclave provided with agitation for 4 hours. The proceeding of the reaction was observed by means of samples that were extracted at intervals given in the table. The results are presented in table 2:

under the propeller, so that the partial pressure of oxygen was 1 bar. The results are presented in table 3.

TABLE 2

Example 2 Results

| Time | Solution g/l | | | | | Pricipitate % | | | | Recovery % | | Composition of end precipitate |
|---|---|---|---|---|---|---|---|---|---|---|---|---|
| | $Ni^{++}$ | $Cu^{++}$ | $Fe^{++}$ | pH | $H_2SO_4$ | Ni | Cu | Fe | S | Ni | Fe | |
| 0 | 0 | 63 | | | 0 | 41 | 31 | 2.6 | 22 | | | |
| 2 | 41 | 20 | | 2.6 | | 2.5 | 66 | | 19 | 93 | | |
| 4 | 42 | 19 | 0.3 | 2.3 | 0.5 | 0.9 | 72 | | 19 | 97 | 12 | $Cu_9S_5$ |

From the results it is seen that no acid has been formed, which proves that the nickel is dissolved, but the sulfur is not oxidized. The reaction speed has been remarkably higher than in the experiment 1.

TABLE 3

Example 3 results

| Time | Solution g/l | | | | | Pricipitate % | | | | Recovery % | | Composition of end precipitate |
|---|---|---|---|---|---|---|---|---|---|---|---|---|
| | $Ni^{++}$ | $Cu^{++}$ | $Fe^{++}$ | pH | $H_2SO_4$ | Ni | Cu | Fe | S | Ni | Fe | |
| Stage 1 | 140° C. | | | | | | | | | Corresponds to autoclave leach 1 | | |
| 0 | 0 | | | | | 41 | 31 | 2.6 | 22 | | | |
| 0.5 | 26 | 0.1 | 0.0 | 3.5 | | | | | | 63 | 1.5 | |
| Stage 2 | 100° C. | | 1 bar air | | | | | | | Corresponds to oxidation 2 | | |
| 0 | | | | | | | | | | | | |
| 0.5 | 26 | 0.0 | 0.0 | 5.4 | | | | | | | | |
| Stage 3 | 140° C. | | | | | | | | | Corresponds to autoclave leach 3 (FIG. 3) | | |
| 0 | | 15 | | | 0 | | | | | | | |
| 1 | 36 | 4.8 | 0.0 | 2.8 | | 3.8 | 68 | | | 91 | | |
| 2 | 38 | 4.1 | 0.0 | 2.9 | | 2.7 | 68 | | | 93 | | |
| 4 | 39 | 3.7 | 0.0 | 2.4 | | 1.6 | 71 | | | 96 | | $Cu_9S_5$ |
| Stage 4 | 100° C. | | 1 bar oxygen | | | | | | | Corresponds to oxidation 2 (FIG. 3) | | |
| 0 | 39 | 9.6 | 2.3 | | 30 | | | | | | | |
| 0.3 | 39 | 21 | 2.3 | | 11.8 | | | | | | | |
| 0.5 | 40 | 29 | 1.7 | | 1.1 | | | | | | | |
| 1 | 41 | 30 | 0.1 | 2.5 | <0.5 | 1.1 | 60 | | | 98 | | CuS |

EXAMPLE 3

This example deals with stages 1, 2, 3 and 4 of flow diagram 3.
Stage 1:
An amount of 250 g ground matte granulated into water and of a solution containing 30 g $Cu^{++}$/l as $CuSO_4$ was heated up to 140° C. and was kept in an autoclave provided with agitation for 0.5 hours. The results are presented in table 3.
Stage 2:
The slurry was cooled down to 100° C. and oxidized by feeding air under the propeller, so that the partial pressure of air was 1 bar. The results are presented in table 3.
To the slurry, there was added 15 g $Cu^{++}$/l as $CuSO_4$ and it was heated up to 140° C. in an autoclave and kept there for 4 hours. The proceeding of the reaction was observed by means of samples that were extracted at intervals given in the table. The results are presented in table 3.
Stage 4:
The slurry was cooled down to 100° C., there was added 35 g of $H_2SO_4$, and it was oxidized by feeding oxygen to under the propeller, so that the partial pressure of oxygen was 1 bar. The results are presented in table 3.

From the results it is seen that no acid is formed, which in turn proves that the dissolution of nickel has taken place without the oxidation of sulfur.

As is seen from examples 2 and 3, the major part of the nickel is dissolved rapidly at the beginning, i.e. in the first autoclave, and respectively at the second stage the solids content of the precipitate can be high. The examples also prove that the reactions described above take place in the conditions given in the examples. In these experiments, the leachs are carried out at the temperature 140° C., but the temperature may vary somewhat, although the top limit is about 160° C., because the crystallization of the nickel sulfide, which begins above that temperature, may lead into technical problems.

Experiments 1 and 2 show that granulated (and rapidly cooled) matte reacts at a remarkably higher speed than a slowly cooled matte. This is understandable, because the crystals in a slowly cooled matte are more faultless, and thus more stable than the crystals in a rapidly cooled matte. For a skilled person, it also is obvious that the fineness of the ground matte is important in the respect that the finer the matte is ground, the higher is the reaction speed. In the experiments described above, the energy applied in the grinding was 80 kWh/t in an open grinding cycle, but naturally this is only an example of the possibilities of the process. The degree of grinding does not affect the performing of the overall process, but it is a factor which must be optimized in all cases (grinding expenses versus leach expenses).

What is claimed is:

1. A method of leaching nickel from a sulfidic nickel-copper matte containing nickel, copper, and iron wherein said matte is pressure leached with copper sulfate at a temperature above the ambient temperature of said matte feed up to about 160° C. to produce a slurry containing a precipitate of digenite and a nickel sulfate bearing solution, and also leaching an essentially metallic copper-nickel matte with sulfuric acid to produce a precipitate and a solution containing nickel- and copper sulfate and sulfuric acid.

2. A method according to claim 1, characterized in that the pressure leach is carried out in one stage.

3. A method according to claim 2, characterized in that the slurry produced in the pressure leach is oxidized by means of oxygen in order to precipitate the iron and copper contained in the solution.

4. A method according to claim 3, characterized in that the precipitate formed in pressure leach and at first oxidation stage and containing digenite and a basic sulfate of copper is oxidized with a sulfuric acid solution and oxygen to produce a copper sulfate solution and a copper sulfide precipitate.

5. A method according to claim 4, characterized in that the precipitate produced at the oxidation stage contains precipitated iron.

6. A method according to claim 3, characterized in that the employed oxygen is any of oxygen, oxygen-enriched air or air.

7. A method according to claim 1, charaterizedin that at most $1/16$ of the sulfur contained in the matte is oxidized during said pressure leach.

8. A method according to claim 1, characterized in that part of the copper sulfate quantity used is obtained by leaching a copper-containing material.

9. A method according to claim 8, characterized in that the material to be leached is an essentially metallized nickel matte produced in the further processing furnace of the pyrometallurgic nickel process.

10. A method according to claim 8, characterized in that the material to be leached is a copper-containing alloy.

11. A method according to claim 1, characterized in that the pressure leach is carried out in several stages.

12. A method according to claim 1 wherein the pressure leach is carried out in several stages.

13. A method according to claim 1 characterized in that the nickel sulfate solution obtained from the pressure leaching is cleaned and, thereafter, subjected to nickel electrolysis.

14. A method as claimed in claim 1, wherein the product obtained from the leaching of said copper-nickel matte is subjected to an oxidation stage.

15. A method according to claim 1 wherein the pressure leach is carried out in two steps.

16. A method of leaching nickel from a sulfidic nickel-copper matte containing nickel, copper, and iron wherein said matte is pressure leached with copper sulfate at a temperature above the ambient temperature of said matte feed up to about 160° C. to produce a slurry containing a nickel sulfate bearing solution and a precipitate of digenite which is oxidized to copper sulfate in two stages, and also leaching an essentially metallic copper-nickel matte with sulfuric acid to produce a precipitate and a solution containing nickel- and copper sulfate and sulfuric acid which solution is conducted to a second oxidation stage of the pressure leaching cycle.

17. A method according to claim 16, characterized in that the pressure leach is carried out in two steps.

18. A method according to claim 17, characterized in that the slurry produced in first pressure leach is oxidized by means of oxygen in order to precipitate the iron contained in the slurry.

19. A method according to claim 17, characterized in that the precipitate produced in a second pressure leach is oxidized by means of a sulfuric acid solution and oxygen to form a copper sulfate solution.

20. A method according to claim 17 characterized in that an insufficient amount of copper sulfate solution in relation to the quantity of nickel present is used in the first pressure leach step.

21. A method according to claim 17, characterized in that an excess of copper sulfate solution in relation to the quantity of nickel present is used in the second pressure leach step.

22. A method according to claim 16, characterized in that the solution produced in the leach of said essentially metallic matte is conducted to a second oxidation stage of the sulfidic matte leach cycle.

23. A method according to claim 16, characterized in that said granulated essentially metallic nickel-copper matte is cooled rapidly prior to leaching.

24. A method of leaching nickel from a sulfidic nickel-copper matte wherein said matte is pressure leached in an autoclave with copper sulfate in one stage at a temperature above the ambient temperature of said matte feed up to about 160° C. to produce a slurry containing a precipitate of digenite and a nickel- and copper-bearing solution, wherein the amount of copper sulfate solution used is in excess to the amount of nickel present in the pressure leach.

25. A method of leaching nickel from a sulfidic nickel-copper matte wherein said matte is pressure leached in an autoclave with copper sulfate at a temperature above the ambient temperature of said matte feed up to about 160° C. to produce a slurry containing a precipitate of digenite and a nickel- and copper-bearing solution wherein said nickel-copper matte is cooled rapidly prior to leaching.

\* \* \* \* \*